(12) United States Patent
DeTreville

(10) Patent No.: US 7,424,747 B2
(45) Date of Patent: Sep. 9, 2008

(54) METHOD AND SYSTEM FOR DETECTING PIRATED CONTENT

(75) Inventor: John D. DeTreville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 09/843,102

(22) Filed: Apr. 24, 2001

(65) Prior Publication Data

US 2002/0156743 A1    Oct. 24, 2002

(51) Int. Cl.
  G06F 7/04    (2006.01)
  G06F 21/24    (2006.01)
  G06K 9/00    (2006.01)

(52) U.S. Cl. .............................. 726/32; 726/30; 726/33; 380/201; 705/51; 705/57; 705/58

(58) Field of Classification Search ................. 380/201; 705/51, 57–58; 726/32–33, 30
See application file for complete search history.

(56) References Cited

U.S. PATENT DOCUMENTS

| | | | |
|---|---|---|---|
| 4,136,395 A | | 1/1979 | Kolpek et al. |
| 5,142,662 A | | 8/1992 | Gump et al. |
| 5,390,297 A | * | 2/1995 | Barber et al. ................. 726/29 |
| 5,619,571 A | | 4/1997 | Sandstrom et al. |
| 5,638,443 A | | 6/1997 | Stefik et al. |
| 5,757,915 A | | 5/1998 | Aucsmith et al. |
| 5,765,152 A | | 6/1998 | Erickson |
| 5,781,629 A | | 7/1998 | Haber et al. |
| 5,818,933 A | | 10/1998 | Kambe et al. |
| 5,832,208 A | * | 11/1998 | Chen et al. ..................... 726/24 |
| 5,956,034 A | | 9/1999 | Sachs et al. |
| 5,986,690 A | | 11/1999 | Hendricks |
| 5,987,525 A | * | 11/1999 | Roberts et al. .............. 709/248 |
| 5,995,623 A | | 11/1999 | Kawano et al. |
| 6,012,890 A | | 1/2000 | Celorio Garrido |
| 6,052,717 A | | 4/2000 | Reynolds et al. |

(Continued)

FOREIGN PATENT DOCUMENTS

EP    1 041 767    10/2000

(Continued)

OTHER PUBLICATIONS

"Ebooks security—theory and practice", retrieved on Aug. 7, 2006 at <<http://www.cs.cmu.edu/~dst/Adobe/Gallery/ds-defcon2/ds-defcon.html>>, ElcomSoft, Jul. 13-15, 2001 pp. 1-10.

(Continued)

Primary Examiner—Ayaz Sheikh
Assistant Examiner—Matthew T Henning
(74) Attorney, Agent, or Firm—Lee & Hayes, PLLC

(57) ABSTRACT

A content player can detect pirated content by storing a list of highly compressed content pieces that correspond to different pieces of content (e.g., audio content, video content, audio/video content, etc.). A piece of content to be played back by the content player is compared to the highly compressed content pieces stored at the content player. If the piece of content to be played back matches one of the highly compressed content pieces, then appropriate responsive action is taken. This repsponsive action can vary, and can include, for example, checking for a valid license, giving the user the option to notify the publisher if he or she has unknowingly acquired a pirated copy of the content, etc.

51 Claims, 4 Drawing Sheets

U.S. PATENT DOCUMENTS

| | | | |
|---|---|---|---|
| 6,119,108 | A | 9/2000 | Holmes et al. |
| 6,161,183 | A | 12/2000 | Saito et al. |
| 6,289,450 | B1 | 9/2001 | Pensak et al. |
| 6,301,660 | B1 | 10/2001 | Benson |
| 6,314,518 | B1 | 11/2001 | Linnartz |
| 6,347,375 | B1 * | 2/2002 | Reinert et al. ............... 726/24 |
| 6,356,287 | B1 | 3/2002 | Ruberry et al. |
| 6,385,596 | B1 * | 5/2002 | Wiser et al. ............... 705/51 |
| 6,388,957 | B2 * | 5/2002 | Yankowski ............... 369/30.06 |
| 6,470,333 | B1 | 10/2002 | Baclawski |
| 6,496,802 | B1 * | 12/2002 | van Zoest et al. ............... 705/14 |
| 6,577,735 | B1 * | 6/2003 | Bharat ............... 380/286 |
| 6,594,686 | B1 * | 7/2003 | Edwards et al. ............... 709/203 |
| 6,735,699 | B1 * | 5/2004 | Sasaki et al. ............... 726/28 |
| 6,766,305 | B1 * | 7/2004 | Fucarile et al. ............... 705/51 |
| 6,868,405 | B1 * | 3/2005 | DeTreville ............... 705/58 |
| 6,868,494 | B1 * | 3/2005 | Shitara et al. ............... 713/189 |
| 6,873,975 | B1 * | 3/2005 | Hatakeyama et al. ............... 705/51 |
| 6,915,425 | B2 * | 7/2005 | Xu et al. ............... 713/165 |
| 7,266,202 | B1 * | 9/2007 | Kawakami et al. ............... 380/283 |
| 7,349,381 | B1 * | 3/2008 | Clark et al. ............... 370/350 |
| 2001/0041989 | A1 * | 11/2001 | Vilcauskas et al. ............... 705/1 |
| 2001/0051996 | A1 * | 12/2001 | Cooper et al. ............... 709/217 |
| 2002/0023020 | A1 * | 2/2002 | Kenyon et al. ............... 705/26 |
| 2002/0129140 | A1 * | 9/2002 | Peled et al. ............... 709/224 |
| 2002/0152262 | A1 * | 10/2002 | Arkin et al. ............... 709/202 |

OTHER PUBLICATIONS

Broder, Glassman, Mansse and Zweig, "Syntactic Clustering of the Web", Digital SRC Technical Note, Jul. 1997, pp. 1-14.

Andrei Broder, "On the resemblance and containment of documents", Digital SRC, pp. 1-9., 1997.

Brin, Davis, and Garcia-Molina, "Copy Detection Mechanisms for Digital Documents", Stanford University, Dept. of Computer Science, 1995, pp. 1-12.

Shivakumar and Garcia-Molina, "Building a Scalable and Accurate Copy Detection Mechanism", Stanford University, Dept. of Computer Science, 1996, pp. 1-9.

Open eBook Publication Structure 1.0, Sep. 16, 1999, all pages.

\* cited by examiner

METHOD AND SYSTEM FOR DETECTING PIRATED CONTENT

TECHNICAL FIELD

This invention relates to piracy, and more particularly to detecting pirated content.

BACKGROUND OF THE INVENTION

The unauthorized copying of media content, often referred to as piracy, is a major concern to the authors, publishers, and distributors of such content. For example, audio content such as songs and video content such as movies can often times be easily copied by people without the legal right to do so. This problem has become particularly troublesome as digital content becomes more pervasive, as storage devices become increasingly cheaper, and as computers become more interconnected (e.g., via the Internet). Unauthorized copying of media content can take place in several forms. For example, digital content may be copied byte by byte on a computer. By way of another example, digital content may be played back in analog form and an analog recording made of the content, which in turn can be converted to digital form again, such as a song stored in digital form being played back in analog form recorded on an analog tape recorder and then the analog recording converted back to digital form.

Various solutions have been proposed to prevent piracy of digital content. One such solution is to encrypt the digital content. Such encryption can often prevent, or at the very least make difficult, the use of unauthorized copies of the digital content. However, the content is inevitably decrypted at some point prior to the final presentation to the user and can be copied while it is unencrypted. For example, in the extreme case, encryption typically does not prevent an individual from making an analog recording of the digital content after it has been decrypted and converted to analog form, and then storing the analog recording in a digital form. Such a digital to analog to digital copying scheme typically results in a newly saved digital recording that is not encrypted, and thus can be freely copied and distributed to unauthorized users.

Another proposed solution is to add watermarks or fingerprints to the digital content that cannot be removed without causing noticeable damage to the content. Software programs can then be designed to not copy any content that is watermarked or fingerprinted. Such proposed watermarks or fingerprints are designed such that they cannot be removed even when making an analog copy of the digital content. However, concerns have been raised as to whether such watermarks or fingerprints can be created and used in an effective manner.

The invention described below addresses these disadvantages, providing methods and systems for detecting pirated content.

SUMMARY OF THE INVENTION

A method and system for detecting pirated content is described herein.

In accordance with one aspect, a content player stores a list of highly compressed content pieces that correspond to different pieces of content (e.g., audio content, video content, audio/video content, etc.). The list of highly compressed content pieces stored at a content player can be static, or alternatively change over time. A piece of content to be played back by the content player is compared to the highly compressed content pieces stored at the content player. If the piece of content to be played back matches one of the highly compressed content pieces, then appropriate responsive action is taken. This responsive action can vary, and can include, for example, checking for a valid license, giving the user the option to notify the publisher if he or she has unknowingly acquired a pirated copy of the content, etc.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
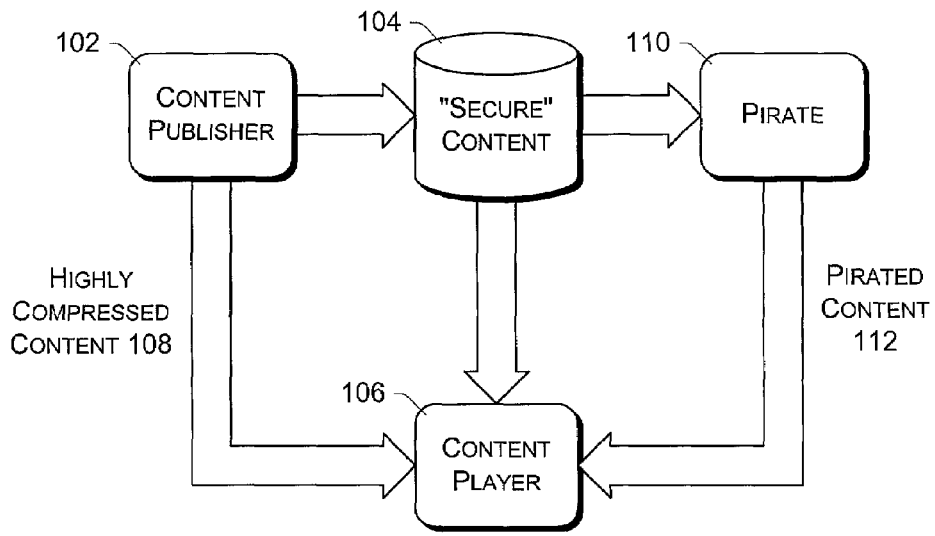
FIG. 1 is a block diagram illustrating an exemplary environment in which the present invention may be practiced.

FIG. 1 is a block diagram illustrating an exemplary environment in which the present invention may be practiced. Content is made available from a content publisher 102 and distributed as secure content 104. Content 104 is referred to as being secure due to a highly compressed version of each portion of the content being made available to detect piracy, as discussed in more detail below. Secure content 104 is made available to content player 106 for playback to a user of player 106. Content layer 106 can be any of a wide variety of devices for playing content, such as desktop or portable computers computing devices, gaming consoles, consumer electronic devices, automotive PCs, handheld PCs, portable music players, portable video players, personal digital assistants (PDAs), etc. Content 104 can be made available in any of a wide variety of conventional formats, such as CD-ROM, DVD, magnetic tape, downloadable files (such as MP3), streaming media, etc. Additionally, content 104 represents any of a wide variety of conventional media content, such as audio content, video content, audio/video content, etc. Content 104 includes multiple pieces or portions, which can be an entire content work (e.g., a song for audio content, a movie or television program for audio/video content, etc.), or alternatively only part of a work (e.g., part of a song, part of a movie, etc.).

Content publisher 102 also makes pieces of highly compressed content 108 available to content player 106. The highly compressed content pieces 108 are highly compressed versions of all of content 104, or of portions of content 104. These highly compressed content pieces refer to versions of portions of content 104 that are created in a manner so that the highly compressed form cannot be decompressed into an intelligible form yet can be compared to uncompressed content for equality with a high degree of accuracy. For example, if the highly compressed content piece for a particular song were to be audibly rendered, it would sound noticeably different from the playback of the song. Content publisher 102 makes highly compressed content available for each portion of content 104. Although numerous pieces of highly compressed content are made available by content publisher 102, only a subset of those pieces is typically maintained by content player 106. The number of pieces included in this subset can vary, however, care should be taken in selecting the number of pieces in this subset given the available memory in content player 106 to store such pieces and the storage requirements of each piece.

In the environment of FIG. 1, a pirate 110 makes unauthorized copies of content 104 and provides pirated content 112 to content player 106. The user of content player 106 may or may not realize that the content 112 is pirated. Content player 106 compares the content at player 106 (for example, during playback of the content) to the subset of highly compressed content pieces 108 stored at player 106. If a match between the content and one of the subset of highly compressed content pieces is identified, content player 106 takes appropriate action. This appropriate action can vary based on the programming of player 106 as well as the desires of the user of player 106. Examples of appropriate action or actions include checking for a valid license at player 106 for the content, accessing another device (not shown) for a more thorough analysis to determine whether the content actually matches content for which player 106 has a license, allowing the user of player 106 to notify the content publisher or other authority of the existence of the pirated content (for example, in return for a potential reward), etc.

Figure 2:
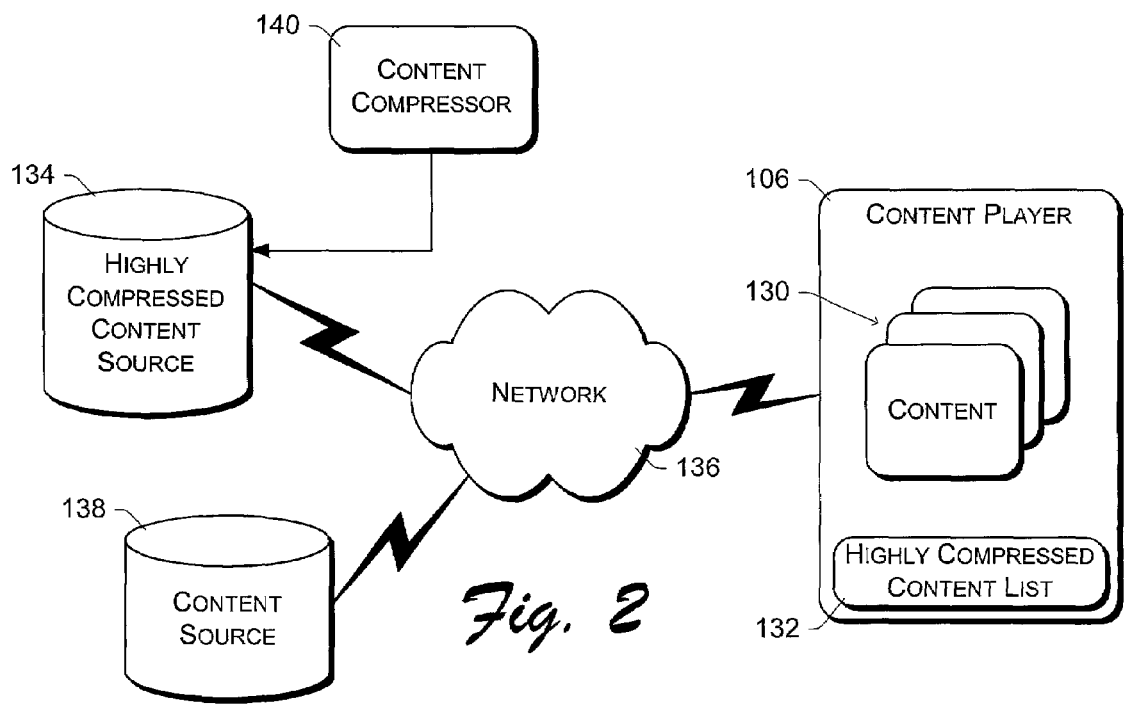
FIG. 2 is a block diagram illustrating an exemplary system incorporating the present invention.

FIG. 2 is a block diagram illustrating an exemplary system incorporating the present invention. Content player 106 stores pieces of content 130 and a highly compressed content list 132. The highly compressed content list 132 includes one or more pieces of highly compressed content received from a highly compressed content source 134, which in turn receives the highly compressed content pieces from a content compressor 140 (e.g., a computing device operated by publisher 102 of FIG. 1). Content player 106 communicates with source 134 via a network 136. Alternatively, the highly compressed content pieces may be generated at player 106. For example, a portion of content (such as a song) may be communicated to content player 106 from content source 138 via network 136. Upon receipt of such content, player 106 generates the highly compressed content piece, stores the generated piece in list 132, and deletes the received portion from its memory. However, if the highly compressed content pieces are generated at player 106, care should be taken to ensure that content player 106 is physically secure so that unauthorized copies of the received portion cannot be made prior to their deletion.

Network 136 represents any of a wide variety of data communications networks, including public and/or private networks (such as the Internet), using both wired and wireless media. Communications between source 134 and content player 106 can be carried out in accordance with any of a wide variety of conventional protocols. Although only a single content player 106, a single highly compressed content source 134, and a single content source 138 are illustrated in FIG. 2, multiple such players 106 and sources 134 and 138 can be communicatively coupled together via network 136.

Figure 3:
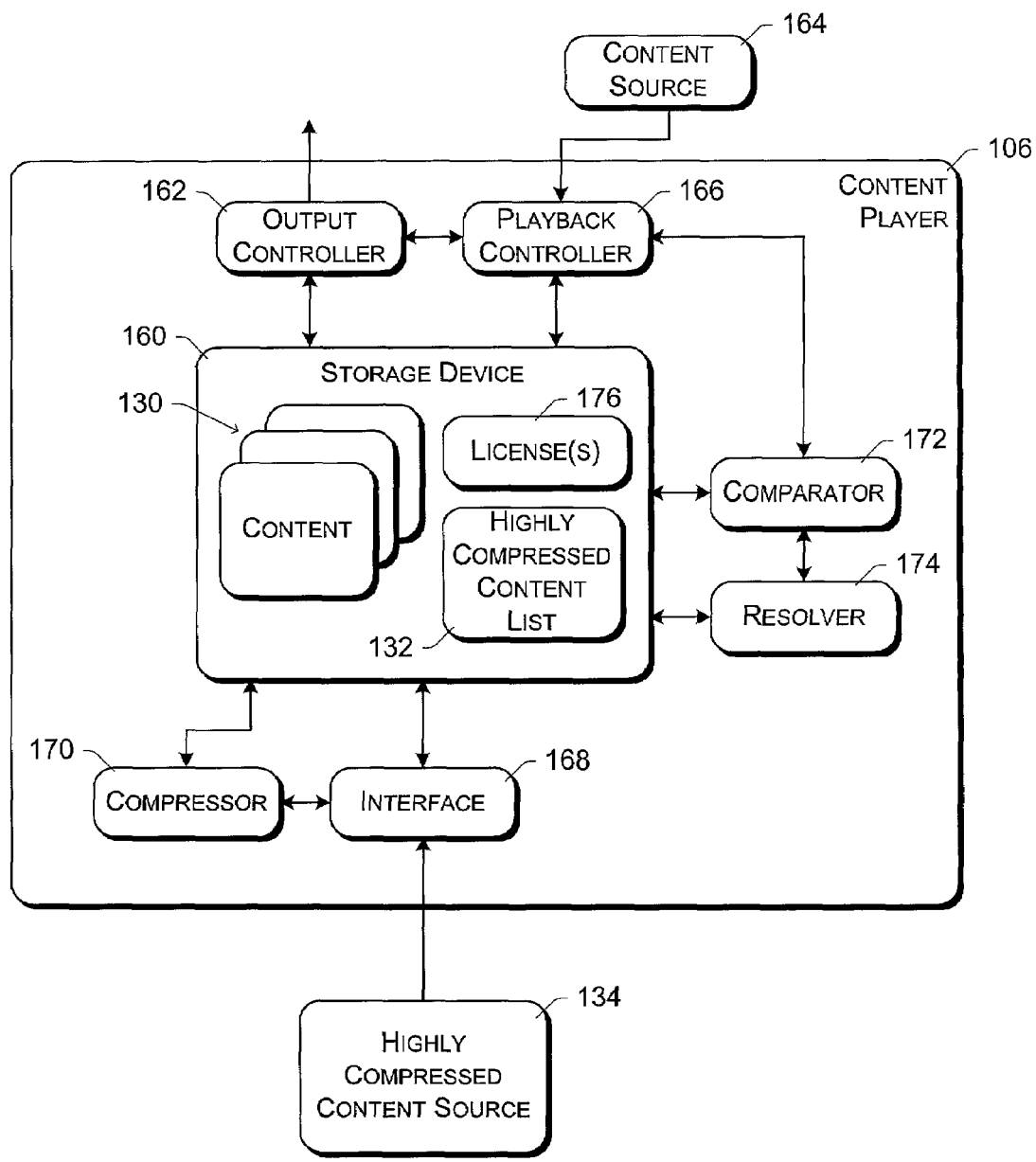
FIG. 3 is a block diagram illustrating an exemplary content player in more detail.

During operation, as shown in FIG. 3, content player 106 compares the pieces of highly compressed content in list 132 with content pieces 130 (e.g., songs) that are made available to it. Content pieces 130 may be stored in memory of content player 106 or alternatively an external source accessible to player 106, such as an optical disk. Multiple content portions 130 may be stored in player 106, with the number of portions stored varying based on the amount memory available in player 106 and storage requirements of each content portion 130. The comparison between content 130 and the highly compressed content pieces 132 can occur at various times. In one implementation, the comparison is performed during playback of the content portion 130. Alternatively, the comparison may be performed at other times, such as during "down" times (for example, when player 106 is not playing back any content), when content is being downloaded for storage in player 106, etc.

Content player 106 stores as list 132 only a subset of pieces of highly compressed content available from source 134 (or generated from content available from source 138). In one implementation this subset is a very small subset of the available pieces of highly compressed content (for example, the subset may be only 10 pieces). The actual number of pieces of content stored in list 132 can vary over time and can vary on a per player basis. Additionally, the pieces of highly compressed content included in list 132 for a particular player 106 can vary over time. These pieces can be changed at any variety of intervals, such as at a particular time each day or each week, each time player 106 is coupled to network 136, whenever requested by the user of player 106, etc.

Because the number of pieces maintained in list 132 is relatively small compared to the total number of content portions that may be available to player 106, the probability of a match existing between a portion of content 130 and a piece of highly compressed content in list 132 on any one player 106 is fairly small. However, if the number of players 106 that include a highly compressed content list 132 is sufficiently large, and each player 106 can maintain a different list 132, the overall probability of a match existing between a portion of content 130 and a piece of highly compressed content in one of the lists 132 on at least one of the multiple players 106 is rather large. Thus, the use of highly compressed content list 132 is more useful in identifying pirated content across multiple devices (for example, players 106) than on any one particular device.

The manner in which the content is highly compressed can vary. However, the goal of the compression is to generate a compressed version of the content portion that cannot be decompressed into an intelligible form while at the same time can be compared to uncompressed content for a determination of equality with a high degree of accuracy, even in light of changes made to the content portion (e.g., a slight speeding up or slowing down of the playback speed, an echo or reverberation added, various parts being filtered out (such as very high or low frequencies), etc.). In other words, the highly compressed content pieces themselves are not useable as playback substitutes for the underlying content portions (e.g., the highly compressed content piece for a song does not have enough information for a user to playback the highly compressed content piece and have it sound similar to the entirety of the song), yet the highly compressed content pieces can be compared to portions of content and the portion that the highly compressed content piece corresponds to reasonably accurately identified. For example, for audio content, the goal of compression is to generate a compressed version of a song that cannot be decompressed to a listenable form and yet can be compared to uncompressed songs for a determination of equality with a high degree of accuracy. Additionally, the manner in which the comparison is made between a highly compressed piece and a content portion can vary, based at least in part on the manner in which the highly compressed piece was generated.

A variety of different compression techniques can be used to generate a highly compressed content piece. One such technique is described in a U.S. patent application Ser .No. 09/843,254, filed Apr. 24, 2001, now issued U.S. Pat. No. 6,973,574, entitled "Recognizer of Audio-Content in Digital Signals", to M. Kivanc Mihcak and Ramarathnam Venkatesan, which is hereby incorporated by reference. Another compression technique that can be used is based on the energy of the content over time. The energy of audio content can be calculated over a variety of different energy bands, and using a variety of different techniques. In one implementation the energy is calculated by dividing the audio into fixed-sized segments (e.g., 10 millisecond segments) and then computing the sum of the squares of the signed audio samples in each segment. By way of example, a song may be compressed by reducing the song to a list of energies computed for each 10 millisecond segment of the song. A number of contiguous groups of energies from this list are then extracted in any of a variety of different manners, such as at random. Groups of energies are extracted from this list, and in one implementation 10 groups of 100 samples of the energy (each representing a total of one second of the song) are extracted. These extracted energy groups for a particular song are then used as the highly compressed content piece for the corresponding song. In situations where multiple channels are associated with the content (e.g., left and right channels for stereo audio content), the energies of these channels can be added together. Alternatively, other channel selection or combinations may be used, such as selecting the loudest channel, representing the energies independently, etc The size of each group (e.g., the number of samples in each group) can vary. In one implementation, care should be taken to select the size of each group to be small enough that time compression and/or time expansion of the content does not adversely affect the comparison process. For example, a pirate may attempt to circumvent the piracy detection described herein by altering the timeline of the content for playback, thereby speeding up or slowing down playback slightly. If the size of each group is too large, then this timeline alteration can cause a match between a group of a highly compressed content piece to be missed.

The number of groups to be extracted can also vary. In one implementation, care should be taken to select the number of groups to be small enough so that highly compressed content pieces are not mistakenly matched to the wrong content portions. For example, song #1 may include parts of song #2 within it, resulting in groups from the highly compressed content piece associated with song #2 matching song #1. Care should be taken that the number of groups used is not large enough so that enough of the groups from the highly compressed content piece associated with song #2 match song #1 to cause the comparison process to indicate that the highly compressed content piece associated with song #2 matches song #1.

Different compression techniques can be used for different types of content (e.g., other than purely audio content). For example, in the case of video content, a list of the brightness of each frame of video may be generated, and groups of these brightness values extracted from the list and used as the highly compressed content piece for the corresponding video content. For example, the brightness of each frame could be computed by summing the intensity of each pixel in the frame. By way of another example, in the case of audio/video content, the highly compressed content piece corresponding to the audio/video content may be made up of groups extracted from the audio part of the content, from the video part of the content, or alternatively both the audio and video parts (e.g., some groups from both).

The groups of samples may be extracted from the list of energies for the content in any of a variety of manners. For example, the set of groups of energies may be extracted according to some predetermined process or alternatively randomly. In one implementation, the selection of groups of samples is weighted so that more (or alternatively all) of the groups are selected from the beginning of the content. For example, all of the groups may be selected from the first half of a song. This allows the comparison process to evaluate most (if not all) of the groups before the entire content portion is played back (assuming the comparison is being performed during playback of the content). By way of another example, a large set (e.g., twenty or thirty) of groups may be initially extracted at random, and then some other criteria (e.g., those with the highest energy) used to select a sub-set (e.g., ten) of groups.

To compare a highly compressed content piece to a content portion that is to be played back, the energy for each segment of the content portion to be played back is extracted from the content portion using the same technique as was used to generate the highly compressed content piece. A sliding window (sliding one audio sample at a time) is used to select a group of energy samples of the same size as the groups used in generating the highly compressed content pieces. In situations where the comparison is being made as the content is being played back, the sliding window includes the energy samples for the most recently played back content. The value of the energy in each group of the highly compressed content piece is then compared to the energy of the generated group based on the content to be played back, and if the values for two groups are within a threshold amount then the process identifies a match between that group of the highly compressed content portion and the portion to be played back.

The distance between the energies of two groups can be determined in any of a wide variety of conventional manners. For example, each group may be normalized and then represented by a vector that includes one element for each energy value included in the group. A difference between these two vectors may be generated using any of a variety of well-known processes, such as by summing the squares of the differences, and the resultant value compared to the threshold.

The comparison process then checks how many of the groups for each highly compressed content piece match the content portion to be played back. If greater than a threshold number of groups match (e.g., greater than 75% of the number of groups in the highly compressed content piece), then the highly compressed content piece is identified as a match to the content portion to be played back.

It should be noted that the comparison process need not account for where in the corresponding content the different groups are extracted from (e.g., five seconds into a song, two minutes into a song, etc.). By not factoring the time that the groups correspond to into the comparison process, the comparison process is more tolerant of changes made to the content by time compression or expansion (e.g., speeding up or slowing down the content in an attempt to avoid a match).

Additional information may also be incorporated into the process of determining whether a highly compressed content piece matches the content portion to be played back. For example, each group in the highly compressed content piece and the content portion may have a timestamp associated with it that identifies an offset (e.g., from the start of the song) into the song at which the group begins. In order for a group in the highly compressed content piece to match a group of the content portion, the timestamps of the two groups need to be within a threshold distance of each other (e.g., within ten seconds of each other). By way of another example, an indication may be maintained of an ordering of the groups in each highly compressed content piece. In order for the highly compressed content piece to match the content portion to be played back, the groups identified in the highly compressed content piece need to match, in the same order as they appear in the highly compressed content piece, groups in the content portion to be played back.

Although energy is described as being extracted above, other features of the content may also be extracted and used rather than energy. Desirable features to be used include those features which represent some particularly audible characteristic (so that audible changes to the content can be detected). Examples of such additional features include computing and comparing the rhythm or beat of audio content, or the balance among the various frequency bands, or whether each energy sample in sequence is or is not greater than the previous sample (followed by a computation of the correlation of the binary values), or by a variety of other techniques.

FIG. 3 is a block diagram illustrating an exemplary content player in more detail. Content player 106 includes a storage device 160, which may be any of one or more types of storage devices including both volatile and non-volatile memory. For example, storage device 160 may be one or more of random access memory (RAM), read-only memory (ROM), flash memory, magnetic disk, optical disk, etc. Storage device 160 optionally includes content 130 to display to a user of player 106 via an output controller 162. Output controller 162 renders content 130 via one or more output devices (not shown) of player 106. The exact nature of output controller 162 can vary depending on the type of content to be rendered. For example, output controller 162 may convert digital content 130 into analog signals for playback of audio content by one or more speakers, output controller 162 may be a conventional video controller for outputting video signals, etc.

Alternatively, media content for playback by content player 106 may be received from external source 164. External source 164 may be any of a wide variety of conventional storage devices such as Flash memory, optical disk, magnetic disk, etc. Content from source 164 is received by playback controller 166 which communicates with output controller 162 to coordinate the playback of the content from source 164.

In addition to storing and playing back the content, the content player 106 may also be used to forward content to other content players, either automatically or on request. This includes the case where the content player operates as a server on a network, whether or not it is used to play back content locally.

Content player 106 also includes an interface 168 via which pieces of highly compressed content can be received from highly compressed content source 134. Alternatively, content player 106 may include a compressor 170 which receives, via interface 168, content from a content source (for example, source 138 of FIG. 2) and generates the highly compressed content pieces for list 132 of the based on the received content.

Content player 106 also includes a comparator 172 which compares content 130 and/or content from content source 164 to the highly compressed content pieces in list 132. As discussed above, this comparison can be performed at a wide variety of different times, such as during playback of the content, when downloading the content, during times when content player 106 is neither downloading new content 130 or playing back content, etc. However, regardless of when (if ever) the content is actually played back by content player 106, the content is available for playback and is also referred to herein as content to be played back. In the event comparator 172 detects a match between a piece of highly compressed content from list 132 and the content to be played back (either content 130 or content from source 164), comparator 172 informs a resolver 174 of the match. Resolver 174 takes an appropriate action in response to such a match, which indicates that the content to be played back has been identified.

Resolver 174 can take any of a wide variety of actions in response to comparator 172 indicating a match. In one implementation, resolver 174 compares the now-established identity of the content to be played back with a set of one or more licenses 176 maintained in storage device 160. Licenses 176 identify content which the user of content player 106 is authorized to playback (for example, for which the user has purchased a license). Licenses 176 can be created and stored on storage device 160 in any of a variety of manners. Such licenses may be received from the content publisher or distributor along with the content licensed. Alternatively, the license may be a separate code (for example, a string of characters and/or digits) which the user must manually enter (for example, via a keyboard). Each license 176 identifies the content that it corresponds to. Resolver 174 compares the identification of the content to be played back with the licenses 176 to determine whether the user of content player 106 has acquired a valid license for the content. If resolver 174 identifies a license 176 for the content to be played back, then no further action need be taken (except for playing back or continuing to play back the content).

However, if no license 176 corresponds to the content to be played back, and the content requires licensing, resolver 174 notifies the user of player 106 that he or she has no valid license for the content to the playback. Resolver 174 can then give the user various options, such as: notify the publisher of the content (or other authority) of the unauthorized content and provide information to the publisher to assist in identifying the source of the unauthorized copy (various incentives may be provided to the user to reveal such information, such as a monetary award for assisting in identifying the source), ignore the lack of a license, attempt to obtain a valid license for the content, etc. Alternatively, other actions could be taken. For example, resolver 174 may contact another remote source (not shown) to perform a more thorough analysis of whether the content to be played back matches a highly compressed content piece from list 132 (e.g., download an additional set of groups for the content and perform the comparison again using the larger set). By way of other examples, resolver 174 may automatically notify the publisher of the pirated copy, resolver 174 may prevent the copy from being played back (or playback of the remaining portion may be prohibited), etc.

The highly compressed content list 132 includes an indication of what license, if any, is needed in order to playback the associated content. For example, the highly compressed content list 132 may include as the indication a public key of the publisher of the content. One of licenses 176 (previously signed by the publisher of the content using the private key of the publisher, or alternatively a chain of delegation certificates that leads to a license or other certificate signed by the publisher of the content using the private key of the publisher) can then be decrypted using the public key from the highly compressed content list 132, and the decrypted license can be reviewed by resolver 174 to determine whether content player 106 has a license for the corresponding content. It should also be noted that situations can arise where the user of content player 106 attempts to playback content for which no license is necessary, such as content within the public domain. In these situations, resolver 174 allows the content to be played back without taking any further action since it does not matter whether the license 176 exists for the content to be played back.

Figure 4:
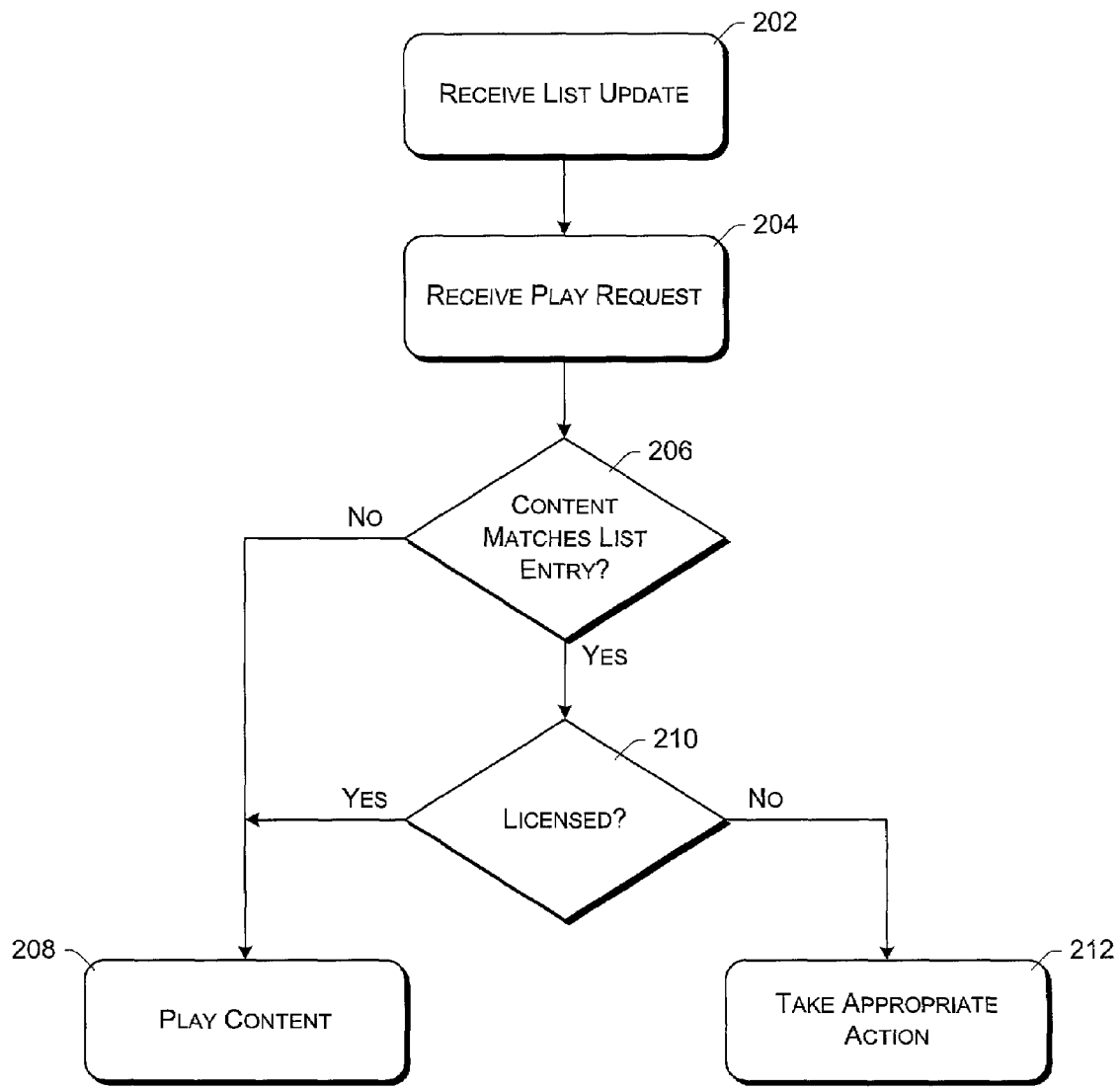
FIG. 4 is a flow chart illustrating an exemplary process for implementing piracy detection in accordance with certain embodiments of the invention.

FIG. 4 is a flow chart illustrating an exemplary process for implementing piracy detection in accordance with certain embodiments of the invention. The process of FIG. 4 is implemented by a content player 106 (of FIGS. 1-3) and may be performed in software. Initially, the content player receives a list update (act 202) that is to be used as the subset of highly compressed content pieces for the content player (for example, list 132 of FIG. 3). Subsequently, the content player receives a play request (act 204) for content stored at or otherwise accessible to the content player. In response to the play request, the content player determines whether the content whose playback is requested matches any entry in the list (act 206). If there is no match, then the content player plays back the content (action 208).

However, if there is a match, and the entry in the highly compressed content list indicated that a license is needed, then the content player checks whether it is licensed to playback the requested content (act 210). If the content player is licensed to playback the requested content, then it does so (act 208). However, if the content player is not licensed to playback the requested content, then the content player takes appropriate remedial action (act 212), such as those discussed above with reference to resolver 174 of FIG. 3.

Figure 5:
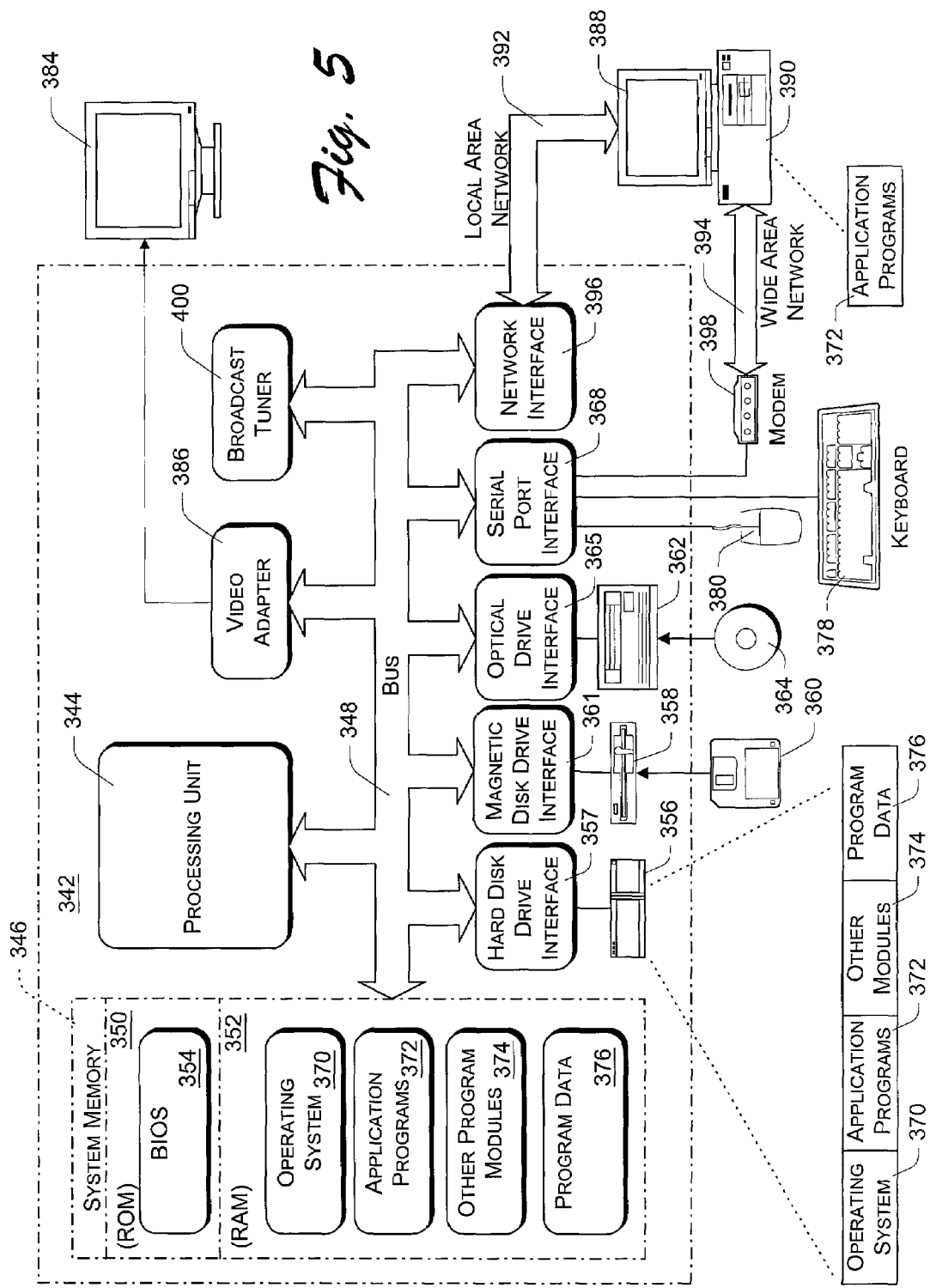
FIG. 5 shows a general example of a computer that can be used in accordance with certain embodiments of the invention.

FIG. 5 shows a general example of a computer 342 that can be used in accordance with certain embodiments of the invention. Computer 342 is shown as an example of a computer in which various embodiments of the invention can be practiced, and can be, for example, a content player 106 of FIGS. 1-3, or a source 134 or 138 or compressor 140 of FIG. 2, etc. Computer 342 is illustrated as only an example of a computing device that may be used with the invention; other devices may alternatively used that include more components or alternatively fewer components than those illustrated in FIG. 5.

Computer 342 includes one or more processors or processing units 344, a system memory 346, and a bus 348 that couples various system components including the system memory 346 to processors 344. The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350.

Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (USB) interface, etc.). A monitor 384 or other type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 5. The logical connections depicted in FIG. 5 include a local area network (LAN) 392 and a wide area network (WAN) 394. Such networking environments are commonplace in offices, enterprise-wide computer networks, intranets, and the Internet. In certain embodiments of the invention, computer 342 executes an Internet Web browser program (which may optionally be integrated into the operating system 370) such as the INTERNET EXPLORER™ Web browser manufactured and distributed by Microsoft Corporation of Redmond, Washington.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 also includes a broadcast tuner 400. Broadcast tuner 400 receives broadcast signals either directly (e.g., analog or digital cable transmissions fed directly into tuner 400) or via a reception device (e.g., via antenna or satellite dish).

Computer 342 typically includes at least some form of computer readable media. Computer readable media can be any available media that can be accessed by computer 342. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A system comprising:
a source database storing a plurality of highly compressed content pieces, wherein highly compressed content pieces comprise groups of energy samples of content, the highly compressed content pieces are created in a manner such that the highly compressed content peices cannot be decompressed into a intelligible form and the highly compressed content pieces can be compared to uncompressed content for equality, the uncompressed content having undergone coversion comprising conversion between digital and anolog; and
a context player, coupled to the source database, the content player comprising:
an interface configured to receive a subset of the plurality of highly compressed content pieces from the source database;
a storage device configured to store the subset, wherein the number of pieces included in the subset is based on the availablity memory in the storage device and the storage required for each piece;
a comparator configured to:
extract an energy sample for each segment of a portion of media content in the content player using a predetermined technique, wherein the same predetermined technique was used to generate the highly compressed content pieces;
select a group of the energy samples of the media content, the group having the same number of energy samples as the groups of the highly compressed pieces;
compare the subset stored in the storage device to a portion of the media content located in the content player, wherein comparing comprises comparing the energy samples in each group of the highly compressed content pieces to the energy samples of the group selected based on the media content; and
determine whether the media content matches any of the plurality of highly compressed pieces in the subset, determining comprising identifying a match between a group of energy samples of a highly content piece and the group of the energy samples of the portion of media content to be played back when the difference between the energy samples of the two groups is within a threshold amount;
a resolver configured to take particular action responsive to the comparator indicating the content matches one of the plurality of highly compressed media content pieces in the subset, the particular action comprising:
contacting a remote device to perform a more thorough analysis of whether the content matches any of the plurality of highly compressed content pieces; and
notifying a publisher of the media content of an existence of pirated media content; and
an output controller configured to render the media content in an event that the comparator indicates the media content does not match any of the highly compressed content pieces in the subset.

2. A system as recited in claim 1, wherein the comparator is to compare the subset to media content being played by the content player.

3. A system as recited in claim 1, wherein the content player is coupled to the source database via the Internet.

4. A system recited in claim 1, wherein the plurality of highly compressed pieces comprises a plurality of highly compressed audio pieces.

5. A system as recited in claim 1, wherein the plurality of highly compressed content pieces comprises a plurality of highly compressed video pieces.

6. a system as recited in claim 1, wherein the plurality of highly compressed content pieces comprises a plurality of highly compressed audio and video pieces.

7. A system as recited in claim 1, wherein the interface is further to subsequently communicate with the source database, retrieve a new subset of the plurality of highly compressed content pieces from the source database, and replace the subset in the storage device with the new subset.

8. A system as recited in claim 1, further comprising a content source coupled to the content player, and wherein the content player further comprises a compressor to receive content from the content source, generate a highly compressed content piece based on the received content, and add the generated highly compressed content piece to the subset in the storage device.

9. A system as recited in claim 1, wherein the storage device is further to store the media content.

10. A system as recited in claim 1, further comprising a content source, coupled to the content player, from which the media content in received.

11. A system as recited in claim 10, wherein the content player receives the media content from the content source in its entirety before playback of the media content begins.

12. A system as recited in claim 1, wherein the comparator is to determine whether the media content matches any of the plurality of highly compressed content pieces in the subset by comparing a first set of feature values associated with each of the plurality of highly compressed content pieces with a second set of feature values associated with the media content, and checking whether at least a threshold nubmer of the first set of feature values is within threshold distance of the second set of feature values.

13. A system as recited in claim 12, wherein the first set of feature values and the second set of feature values comprises a set of audio energy features.

14. A system comprising:
a source database storing a plurality of highly compressed content pieces, wherein highly compressed content pieces comprise groups of energy samples of content, the highly compressed content pieces are created in a manner such tht the highly compressed form cannot be decompressed into an intelligible form yet can be compared to uncompressed content for equality and the uncompressed content has undergone conversion comprising conversion between digital and analog; and
a content player coupled to the source database, the content player including,
an interface to receive a subset of the plurality of highly compressed content pieces from the source database,
a storage device to store the subset, wherein the number of pieces included in the subset can vary based on the availablity memory in the storage device and the storage required for each piece,
a comparator configured to:
extract an energy sample for each segment of a portion of media content in the content player using a predetermined technique, wherein the same predetermined technique was used to generate the highly compressed content pieces,
select a group of the energy samples of the media content, the group having the same number of energy samples as the groups of the highly compressed content pieces.
compare the subset stored in the storage device to a portion of the media content located in the content player, wherein comparing comprises comparing the energy samples in each group of the highly compressed content pieces to the energy samples of the group selected based on the media content and
determine whether the media content matches any of the plurality of highly compressed content pieces in the subset, determining comprising identifying a match between a group of energy samples of a highly compressed content piece and the group of the energy samples of the portion of media content to be played back when the difference between the energy samples of the two groups is within a threshold amount.
a resolver to take particular action in response to the comparator indicating the media content matches one of the plurality of highly compressed content pieces in the subset, the particular action comprising notifying a publisher of the media content of an existence of pirated media content, and
wherein the storage device is further to store a plurality of licenses identifying media content that a user of the content player is authorized to playback and wherein the particular action comprises the resolver checking whether one of the plurality of licenses corresponds to the media content and contacting a remote device to perform a more thorough analysis of whether the media content matches any of the plurality of highly compressed content pieces.

15. A system as recited in claim 14, wherein each of the plurality of highly compressed content pieces in the subset further indicates whether one of the plurality of licenses in required for playback of the content.

16. A media player comprising:
a memory to store one or more highly compressed content pieces, the content comprising audio content, wherein highly compressed content pieces comprise groups of energy samples of content, the highly compressed content pieces are created in a manner such that the highly compressed form cannot be decompressed into a intelligible form yet can be compared to uncompressed content for equality, and wherein the one or more highly compressed content pieces constitute a subset of the total number of highly compressed content pieces, and the number of pieces included in the subset varies based on the available memory and the amount of memory required for each piece;
a comparator, coupled to the memory, the comparator configured to:
extract an energy sample for each segment of a portion of media content in the media player using a predetermined technique, wherein the same predetermined technique was used to generate the highly compressed content pieces;
select a group of the energy samples of the media content, the group having the same number of energy samples as the groups of the highly content pieces;
compare the subset of the one or more highly compressed content pieces located in the media player to media content being played by the media player, wherein comparing comprises comparing the energy samples in each group of the highly compressed content pieces to the energy samples of the group selected based on the media content; and
determine whether the media content matches at least one of the one or more highly compressed content pieces in the subset, determining comprising indentifying a match between a group of energy samples of a highly compressed content piece and the group of the energy samples of the portion of media content to be played back when the difference between the energy samples of the two groups is within a threshold amount; and
a resolver, coupled to the comparator, to take a particular action in reponse to the comparator indicating the media content matches one of the plurality of highly compressed content pieces in the subset, wherein the particular action comprises:
checking to see whether the media player has a valid license for the media content;
contacting a remote device to perform a more thorough analysis of whether the media content matches any of the plurality of highly compressed content pieces in the subset; and
notifying a publisher of the media content of an existence of pirated media content when the more thorough analysis confirms the portion of media content matches any of the subset of highly compressed content pieces.

17. A media player as recited in claim 16, wherein the memory is further to store the media content.

18. A media player as recited in claim 16, further comprising a playback controller, coupled to the memory, to receive the media content from an external source.

19. A media player as recited in claim 18, wherein the external source comprises a CD.

20. A media player as recited in claim 16, further comprising an interface, coupled to the memory, to receive the one or more highly compressed content pieces from a compressed content source.

21. A media player as recited in claim 16, further comprising a compressor, coupled to the memory, to receive media content and generate the one or more highly compressed content pieces.

22. A media player as recited in claim 16, wherein the comparator is to determine the content matches any of the plurality of highly compressed content pieces in the subset by comparing a first set of feature values associated with each of the plurality of highly compressed content pieces with a second set of feature values associated with the content, and checking whether at least a threshold number of the first set of feature values is within threshold distance of the second set of feature values.

23. A media player as recited in claim 22, wherein the first set of feature values and the second set of feature values each comprises a set of audio energy features.

24. A media player as recited in claim 16, wherein the media player comprises a portable music player.

25. A media player as recited in claim 16, wherein each of the one or more highly compressed content pieces further indicates whether a license is required for playback of the corresponding media content.

26. A method implemented in a media player, the method comprising:
   extracting an energy sample for each segment of a portion of media content in the media player using a predetermined technique, wherein the same predetermined technique was used to generate highly compressed content pieces comprising groups of energy samples of content, the highly compressed content pieces created in a manner such that the highly compressed form cannot be decompressed into an intelligible form yet can be compared to uncompressed content for equality;
   selecting a group of the energy samples of the media content, the group having the same number of energy samples as the groups of the highly compressed content pieces;
   comparing a portion of the media content located in the media player to a subset of one or more highly compressed content pieces located in the media player, wherein the comparing comprises comparing the energy samples in each group of the highly compressed content pieces to the energy samples of the group selected based on the media content;
   determining whether the portion of media content matches any of the subset of highly compressed content pieces, the determining comprising identifying a match between a group of energy samples of a highly compressed content piece and the group fo the energy samples of the portion of media content to be played back when the difference between the energy samples of the two groups is within a threshold amount;
   taking a programmed action when the portion of media content matches any of the subset of highly compressed pieces, the programmed action comprising notifying a publisher of the media content of the existence of pirated content; and
   playing back the media content by the media player when the determining indicates the portion of media content does not match any of the subset of highly compressed pieces.

27. A method as recited in claim 26, wherein the portion of media content comprises a song.

28. A method as recited in claim 26, wherein the portion of media content comprises a video clip.

29. A method as recited in claim 26, further comprising performing the comparing while the portion of media content is being played.

30. A method as recited in claim 26, further comprising performing the comparing while the portion of media content is being downloaded from a content source.

31. A method as recited in claim 26, further comprising receiving the subset of highly compressed pieces from a highly compressed content piece source.

32. A method as recited in claim 31, further comprising subsequently receiving a new subset of highly compressed pieces from the highly compressed content piece source, and replacing the subset with the new subset.

33. A method as recited in claim 26, further comprising:
   receiving content from a content source;
   generating a highly comressed content piece based on the received content; and
   adding the generated highly compressed content piece to the subset of highly compressed pieces.

34. A method as recited in claim 26, wherein the determining comprises:
   comparing a first subset feature values associated with each of the plurality of highly compressed pieces with a second subset of feature values associated with the portion of media content; and
   checking whether at least a threshold number of the first subset of feature values is within threshold distance of the second subset of feature values.

35. A method as recited in claim 34, wherein the first subset of feature values and the second subset of feature values each comprises a set of audio energy features.

36. A method as recited in claim 26, wherein the media content comprising the portions of media content has undergone conversion.

37. A method as recited in claim 36, wherein the conversion comprises conversion between digital and analog.

38. A method implemented in a content player, the method comprising:
   extracting an energy sample for each segment of a portion of media content in the content player using a predetermined technique, wherein the same predetermined technique was used to generate highly compressed content pieces comprising groups of energy samples of content, the highly conpressed content pieces created in a manner such that the highly compressed form cannot be decompressed into an intelligible form yet can be compared to uncompressed content form equality;
   selecting a groups of the energy samples based on the media content, the group having the same number of energy samples as the groups of the highly compressed content pieces;
   comparing a portion of the media content located in the content player, the media content comprising audio content, to a subset of one or more highly compressed content pieces located in the content player, wherein the number of highly compressed content pieces included in the subset varies based on the available memory in the storage device and the storage required form each piece, and the comparing comprises comparing the energy samples in each group of the highly compressed content pieces to the energy samples of the group selected based on the media content;

determining whether the portion of media content matches any of the subset of highly compressed content pieces, the determining comprises identifying a match between a group of energy samples of a highly compressed content piece and the group of the energy samples of the portion of media content to be played back when the difference between the energy samples of the two groups is within a threshold amount; and taking a programmed action when the portion of the media content matches any of the subset of highly compressed pieces, wherein the programmed action comprises:

checking whether one of a plurality of licenses maintained at the content player performing the comparing corresponds to the portion of media content;

contacting a remote device to perform a more thorough analysis of whether the content matches any of the plurality of highly compressed content pieces; and notifying a publisher of the media content of an existence of pirated media content when the more thorough analysis confirms the portion of media content matches any of the subset of highly compressed content pieces.

39. One or more computer-readable memories containing a computer program that is executable by a processor of a media player to perform a method comprising:

extracting an energy sample for each segment of a portion of media content in a media player using a predetermined technique, wherein the same predetermined technique was used to generate highly compressed content pieces comprising groups of energy samples of content, the highly compressed content pieces created in a manner such that the highly compressed form cannot be decompressed into an intelligible form yet can be compared to uncompressed content for equality;

selecting a group of the energy samples of the media content, the group having the same number of energy samples as the groups of the highly compressed content pieces;

comparing, at the media player, a portion of the media content to a subset of one or more highly compressed content pieces located in the media player wherein:

the number of pieces inlcuded in the subset can vary based on the available memory in a storage device of the media player and the storage required for each piece, and the comparing comprises comparing the energy samples in each group of the highly compressed content pieces to the energy samples of the group selected based on the media content;

determining whether the portion of media content matches any of the subset of highly compressed content pieces, the determining comprising identifying a match between a group of energy samples of a highly compressed content piece and the group of the energy samples of the portion of media content to be played back when the difference between the energy samples of the two groups is within a threshold amount;

checking, when the portion of media content matches any of the subset of highly compressed content pieces, whether a valid license for the media content is present at the media player;

contacting a remote device to perform a more thorough analysis of whether the media content matches any of the plurality of highly compressed content pieces;

notifying a publisher of the media content of an existence of pirated media content when the more thorough analysis confirms the portion of media content matches any of the subset of highly compressed pieces; and rendering the media content by the media player when the determing indicates the portion of media content does not match any of the subset of highly compressed pieces.

40. A media player comprising:

means for storing a subset of highly compressed content pieces, wherein highly compressed content pieces comprise groups of energy samples of content the highly compressed content pieces are created in a manner such that the highly compressed form cannot be decompressed into an intelligible form yet can be compared to uncompressed content for equality, and wherein the number of pieces included in the subset can vary based on the available memory in the means for storing and the storage required for each piece;

means for determining, at the media player, whether a portion of media content located in the media player, the portion of media content having undergone conversion comprising conversion between digital and analog, matches any of the subset of highly compressed content pieces located in the media player, the means for determining performing steps comprising:

extracting an energy sample for each segment of a portion of media content in the media player using a predetermined technique, wherein the same predetermined technique was used to generate the highly compressed content pieces;

selecting a group of the energy samples of the media content, the group having the same number of energy samples as the groups of the highly compressed content pieces;

comparing the subset stored in the means for storing to a portion of the media content located in the media player, wherein comparing comprises comparing the energy samples in each group of the highly compressed content pieces to the energy samples of the group selected based on the media content; and identifying a match between a group of energy samples of a highly compressed content piece and the group of the energy samples of the portion of media content to be played back when the difference between the energy samples of the two groups is within a threshold amount;

means for taking a particular action when the portion of media content matches any of the subset of highly compressed content pieces, the particular action comprising notifying a publisher of the media content of the existence of pirated media content; and means for playing back the media content when the determining indicates the portion of media content does not match any of the subset of highly compressed content pieces.

41. A media player as recited in claim 40, further comprising means for receiving an update subset of highly compressed content pieces and replacing the subset compressed content pieces with the update subset of highly compressed content pieces.

42. A media player as recited in claim 40, further comprising means for receiving the subset of highly compressed content pieces.

43. A media player as recited in claim 40, further comprising means for generating the subset of highly compressed content pieces.

44. A media player as recited in claim 40, wherein the means for storing is further for storing the portion of media content.

45. One or more computer storage media having stored thereon a plurality of instructions that, when executed by one or more processors of a content player, causes the one or more processors to perform acts comprising:

checking, at the content player, whether a portion of media content matches a piece of highly compressed content, the checking comprising:

extracting an energy sample for each segment of a portion of media content in the content player using a predetermined technique, wherein the same predetermined technique was used to generate pieces of highly compressed content comprising groups of energy samples of content, the pieces of highly compressed content created in a manner such that the highly compressed form cannot be decompressed inot an intelligible form yet can be compared to uncompressed content for equality;

selecting a group of the energy samples of the media content, the group having the same number of energy samples as the groups of the pieces of highly compressed content;

comparing a portion or the media content location in the content player to a subset of one or more pieces of highly compressed content located in the content player, wherein the comparing comprises comparing the energy samples in each group of the pieces of highly compressed content to the energy samples of the group selected based on the media content; and determining whether the portion of media content matches any of the subset of pieces of highly compressed content, the determining comprising identifying a match between a group of energy samples of a piece of highly compressed content and the group of the energy samples of the portion of media content to be played back when the difference between the energy samples of the two groups is within a threshold amount allowing the portion of media content to be played back by the content player when the portion of media content does not match the piece of highly compressed content; and taking a particular action when the portion of media content does match the piece of highly compressed content, wherein the particular action comprises:

obtaining an additional piece of highly compressed content in order to perform a more thorough analysis of whether the media content matches the piece of highly compressed content; and notifying a publisher of the media content of an existence of pirated content.

46. One or more computer storage media as recited in claim 45, wherein the portion of media content includes one or more of audio content and video content.

47. One or more computer storage media as recited in claim 45, wherein the plurality of instructions further cause the one or more processors to perform acts including receiving the piece of highly compressed content from a highly compressed content source.

48. One or more computer storage media as recited in claim 47, wherein the plurality of instructions further cause the one or more processors to perform acts including subsequently receiving a new piece of highly compressed content from the highly compressed content source, and replacing the piece with the new piece.

49. One or more computer storage media as recited in claim 45, wherein the plurality of instructions further cause the one or more processors to perform acts including:

receiving content from a content source; and generating the piece of highly compressed content based on the received content.

50. One or more computer storage media as recited in claim 45, wherein the checking comprises:

comparing a first set of feature values associated with the piece of highly compressed content with a second set of feature values associated with the portion of media content; and checking whether at least a threshold number of the first set of feature values is within threshold distance of the second set of feature values.

51. One or more computer storage media as recited in claim 50, wherein the first set of feature values and the second set of feature values each comprises a set of audio energy features.

\* \* \* \* \*